Oct. 21, 1969          J. K. GREGSTON          3,473,611
               METHOD FOR TREATING GAS LIFT WELLS
Original Filed July 10, 1967                  2 Sheets-Sheet 1
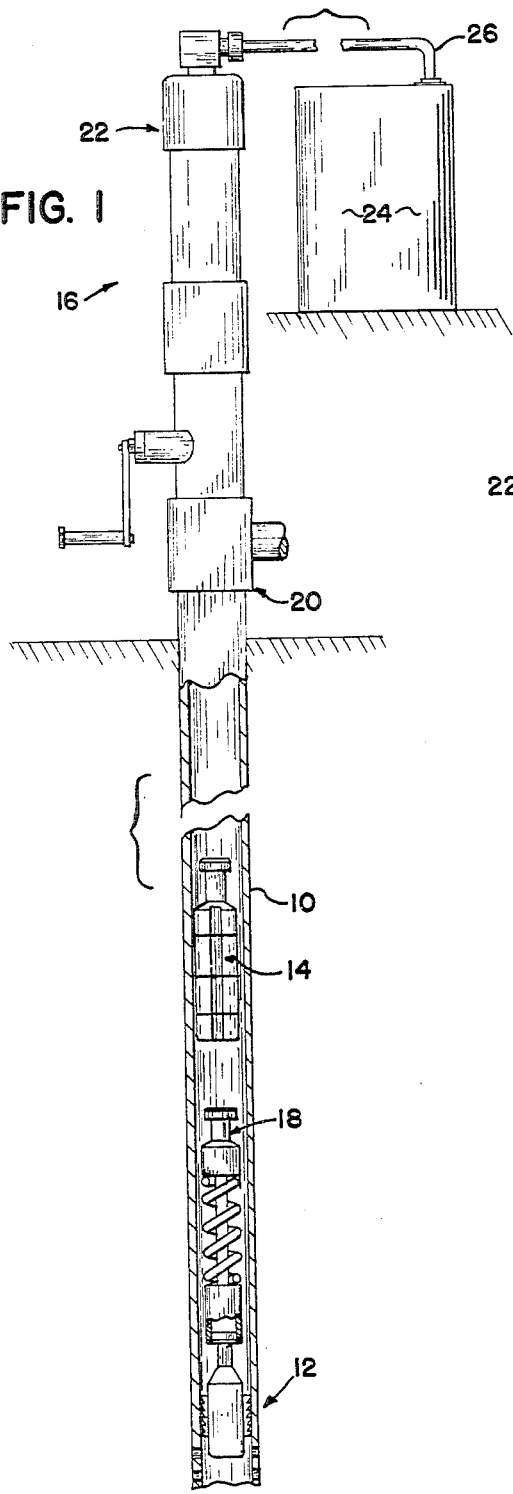
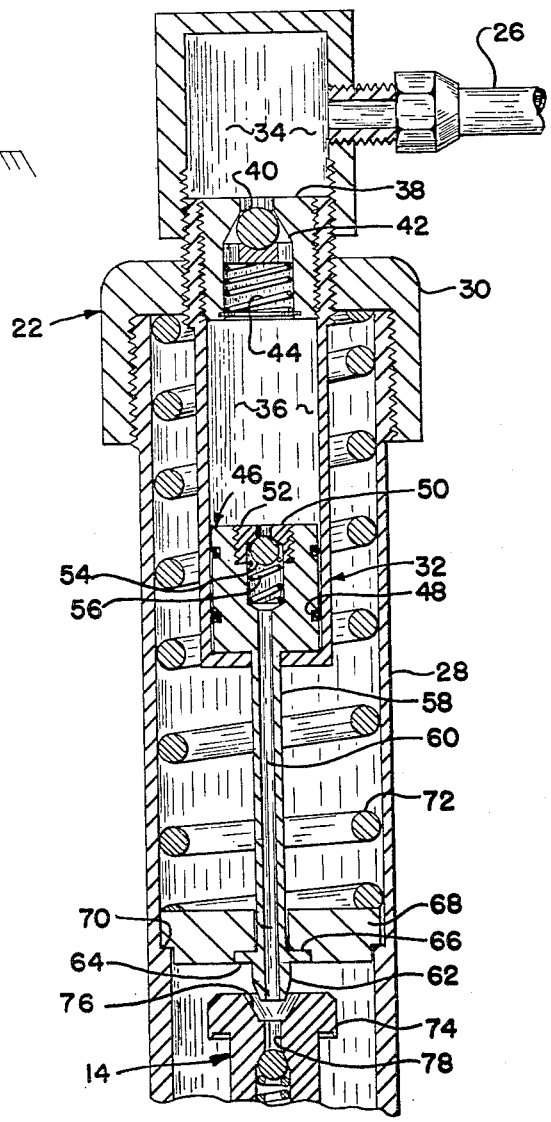
INVENTOR
JERRY K. GREGSTON
BY
MARCUS L. BATES Oct. 21, 1969  J. K. GREGSTON  3,473,611
METHOD FOR TREATING GAS LIFT WELLS
Original Filed July 10, 1967  2 Sheets-Sheet 2

INVENTOR
JERRY K. GREGSTON
BY
MARCUS L. BATES

United States Patent Office 3,473,611
Patented Oct. 21, 1969

3,473,611
METHOD FOR TREATING GAS LIFT WELLS
Jerry K. Gregston, 1224 Danville,
Richardson, Tex. 75080
Continuation of application Ser. No. 652,107, July 10, 1967. This application Oct. 4, 1968, Ser. No. 765,210
Int. Cl. E21b 43/12
U.S. Cl. 166—310                                5 Claims

ABSTRACT OF THE DISCLOSURE

A chemical injection means associated with the lubricator and free plunger of a gas lift well, wherein the traveling plunger includes a cavity associated with valve means which cooperates with an injection means provided in the lubrator in a manner to charge the traveling plunger with a quantity of chemical each cycle thereof. The traveling plunger falls to the bottom of the well where it strikes a bumper pad. Upon striking the bumper pad, a valve means associated with the plunger opens to thereby permit chemical to flow or intermingle with the fluid contained within the bottom of the well. Upon the traveling plunger striking the bumper pad associated with the lubricator, chemical is injected into the traveling plunger. Accordingly, each reciprocation, or cycle, of the plunger within the well tubing carries a specific quantity of chemical to the bottom of the well.

---

This application is a continuation of application S.N. 652,107 filed July 10, 1967 and now Patent No. 3,412,798.

BACKGROUND

Gas lift apparatus for lifting fluid from the bottom of a well to the surface of the earth by utilizing a traveling plunger, sometimes called a free piston, are known in the art. The traveling plunger strikes a stop means located at the top of the well, called a lubricator, whereupon the traveling plunger is caused to assume a flow permitting configuration whereby it will be enabled to freely drop through the column of liquid contained within the well tubing. The plunger free falls through the well tubing until it strikes a stop means located at the bottom of the well. Upon striking the stop means at the bottom of the well, the plunger assumes a flow preventing configuration whereby it essentially acts as a packer, or a piston, because fluid cannot flow around or through the plunger. Accordingly, when an outflow valve above the surface of the ground is opened, the gas pressure associated with the bottom of the well forces the plunger to the surface of the earth due to the difference in pressure across the plunger. Fluid trapped above the plunger is lifted through the outflow valve.

SUMMARY

It is desirable to treat a well with various chemicals such as detergents, anti-acids, dewaxing compounds, corrosion resistant compounds, as well as many other known chemicals in order to improve the production of the well in addition to improving the life of the various components associated with the well. The problem of transporting a quantity of chemical from the surface of the earth to the bottom of a well is best solved by utilizing the free piston itself in order to transport the chemical since the free piston is generally cycled at a frequency which is based upon the production of the well, and accordingly, each cycle of the piston represents a definite quantity of well fluid being lifted to the surface of the earth. Therefore, a certain quantity of chemical injected into the free plunger, or traveling piston, and dispersed by the plunger at the bottom of the bore hole, will provide the well fluid with a proportionate amount of chemical based on the production of the well.

It is therefore an object of this invention to provide a method of treating gas lift wells by utilizing the same traveling plunger which lifts the fluid from the oil bearing stratum to a location above the surface of the ground.

Another object of the present invention is the provision of a chemical injection means associated with the lubricator of an oil well which injects chemical into a traveling plunger.

Another object of this invention is the provision of a traveling plunger which transports chemical from the top of a well tubing to the bottom of a well tubing.

Another object of this invention is the provision of a chemical injector associated with the lubricator of an oil well which injects chemical into a traveling plunger.

Another object of this invention is the provision of a traveling plunger which ingests chemical upon striking an upper stop means associated with a well and which releases chemical upon striking a lower stop means associated with the well.

A still further object of this invention is the provision of a method of treating oil wells by the use of a traveling plunger for transporting chemical from the surface of the earth to the bottom of an oil well.

The above objects are attained in accordance with the present invention by the provision of an apparatus essentially as described in the above abstract.

BRIEF DESCRIPTION OF THE DRAWING

FIG. 1 is a side elevational view, with some parts being broken away, and other parts being shown in section, in order to illustrate the present invention;

FIGURE 2 is an enlarged cross-sectional view of part of the device seen in FIGURE 1, with some parts being broken away in order to conserve space;

Figure 3:
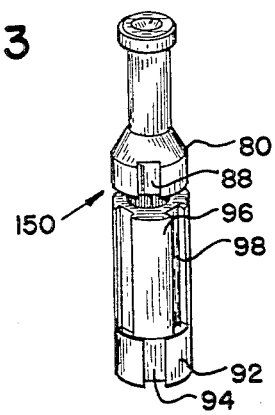
FIGURE 3 is a perspective view of a traveling plunger which may be used in a manner as seen in FIGURE 1, with the plunger being shown in the flow resisting configuration.

Looking now to the details of FIGURE 1 in conjunction with the remaining figures, there is seen illustrated therein a cross-sectional view of an oil well of the gas lift type. The well includes a tubing 10 which communicates with an oil bearing stratum 12. A traveling plunger 14, sometimes also called a free piston, reciprocates within the tubing between a lubricator 16 and a lower stop means 18. The lubricator also includes an upper stop means, usually in the form of a bumper pad. Fluid produced from stratum 12 is lifted by the traveling plunger 18 to where it flows through an outlet provided at 20. The lubricator 16 includes a chemical injection device 22 which is operatively connected to a chemical source 24 by flow line 26.

Looking now in particular to FIGURE 2, which further illustrates the details of the chemical injector 22, there is seen illustrated therein an upstanding cylinder 28 having an apertured closure means 30 at the upper extremity thereof which threadedly receives a pump as generally illustrated by the arrow at 32. The pump includes a first chamber 34, a second chamber 36, each of which are separated from each other by the removable valve unit 38. The valve unit includes a spring biased ball check valve 40 which is urged against valve seat 42 by a caged spring 44. The second chamber 36 carries a pump piston assembly 46 slidably located therein and having O-rings 48 about the outside peripheral surface thereof. A second check valve assembly 50 is carried by the pump piston.

Check valve assembly 50 includes a removable valve seat 52 having a ball check valve 54 which is urged against the seat by a caged spring 56.

Piston 46 includes a piston rod 58 depending therefrom and further includes a passageway 60 which communicates the second chamber and the depending free end 62 of the piston rod. Intermediate the depending end and spaced apart from the piston is a circumferentially disposed flange 64 which is received within a counterbore 66 of a bumper pad 68. The bumper pad provides a stop means for the plunger. The bumper pad is provided with a circumferentially described shoulder 70 which cooperates with an oppositely arranged shoulder on the lubricator 28 to thereby provide motion limiting means therefor. The bumper pad is biased in a downward direction by a heavy coil spring 72 which is designed to be "fully stacked" when fully compressed.

As further seen in FIGURE 2, the depending free end of the piston rod is sloped at 62 in a manner whereby it will be forced into sealed alignment with a similarly shaped inlet 76 of the before mentioned free piston 14. Inlet 76 communicates with the passageway 78 of the free piston for a reason which will be pointed out in greater detail later on.

Figure 4:
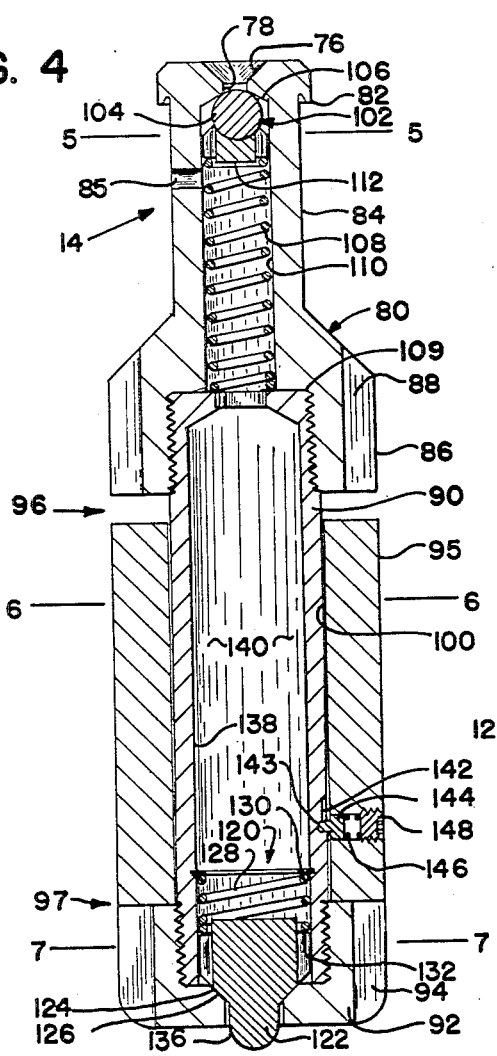
FIGURE 4 is an enlarged cross-sectional view of a plunger such as seen in FIGURE 3; with the plunger being shown in flow restricting configuration.
Figure 5:
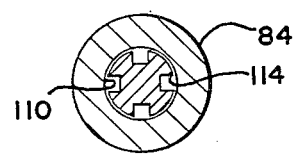
FIGURE 5 is a cross-sectional view taken along line 5—5 of FIGURE 4.
Figure 6:
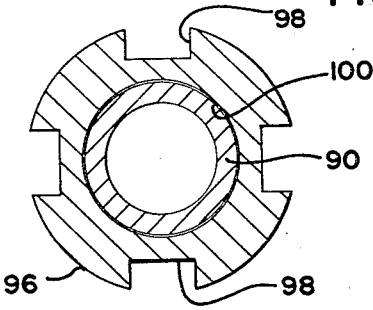
FIGURE 6 is a cross-sectional view taken along line 6—6 of FIGURE 4.
Figure 7:
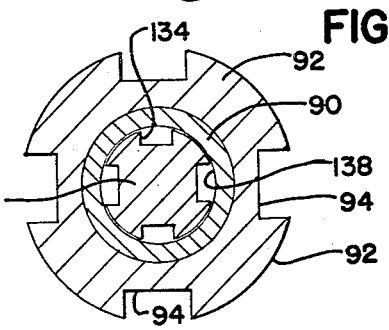
FIGURE 7 is a cross-sectional view taken along line 7—7 of FIGURE 4.

Looking now to the details of the remaining figures, wherein there is seen the before mentioned free piston 14 in the flow restricting position in FIGURES 3 and 4. The piston 14 includes a mandrel 80 comprised of an upper enlargement 82, a neck portion 84, a further enlarged portion 86 having longitudinally arranged slots 88 radially disposed about the outer surface thereof, an elongated centrally located hollow mandrel 90, a lower enlarged portion 92 having longitudinally arranged slots 94 radially disposed about the outside periphery thereof, all connected together in a manner to provide a rigid assembly. A unitized movable centrally located body member 95 having longitudinally arranged splines 98 radially disposed about the outside periphery thereof, with an inside passageway 100 which reciprocatingly and slidably receives the before mentioned central mandrel 90 in a telescoping manner therewithin.

The neck 84 carries a first valve assembly 102 therein and includes a ball check valve 104 which is biased against a seat 106 by a coiled spring 108. The coiled spring is caged between the upper outwardly disposed face 109 of the central mandrel, the inside passageway 110 of the mandrel neck, and the depending ball check valve retainer member 112. The ball retainer is slotted as illustrated at 114 to permit flow of fluid therethrough when the valve is unseated.

A second valve assembly 120 includes a nippled spring biased valve element 122 having a sloped portion 124 which is forced against the seat 126 by means of the coiled spring 128. The coiled spring is compressed between a snap ring 130 and a shoulder 132 which is circumferentially cut about the valve element. The valve element is slotted as seen at 134 to permit flow of fluid therethrough when the valve is upset by the protruding nipple portion 136. The inside peripheral wall surface of the central mandrel 90 forms a chamber 140 which may contain a chemical substance for treating the well fluid.

A curved guide spline or slot 142 is milled into the outer surface of the central mandrel, with the longitudinal direction of the spline forming an angle with respect to the longitudinal central axis of the mandrel, an amount which will impart rotation to member 95 an amount to equally misalign splines 98 with splines 94 and 88, as illustrated in FIGURE 3, when the plunger assumes the flow preventing configuration, which is also the lowermost position of member 95; and to align splines 98 with splines 94 and 88 when the plunger assumes the flow permitting configuration, which is the uppermost position of member 95.

Guide means 143 is a continuation of member 144, which is biased by captured spring 146. Plug 148 facilitates disassembly of the components. Several guide means may be radially spaced about the mandrel.

Figure 8:
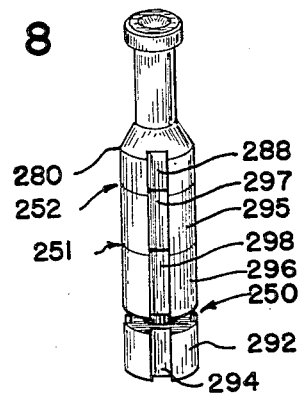
FIGURE 8 is a perspective view of a modification of the plunger seen in the foregoing figures.

As seen in the modification of FIGURE 8, the plunger includes two centrally located body members, 295 and 296, each receiving splines 297 and 298, which align with splines 288 and 294 when the plunger is in the flow permitting configuration. As seen in FIGURE 8, lower enlarged portion 292 is spaced apart from member 296 to provide a gap at 250, with the gap at 251 and 252 being closed. This is the configuration enjoyed after the plunger has impacted against the upper stop means, which enables the plunger to free fall back to the bottom of the hole. Each member 295 and 296 is provided with the before mentioned guide means 142 through 148, with the spline 142 of one member 295 extending in opposite relationship with respect to the adjacent member 296 to thereby enable opposite relative rotation as each member reciprocates along the mandrel.

OPERATION

In operation, the free piston 14 reciprocates within the tubing between the lower stop means 18 and the upper stop means 22. The free piston 14, when in the closed configuration of FIGURE 3, travels upwardly through the tubing 10 in the usual manner, carrying a slug or column of fluid thereabove until it abuts the bumper pad or upper stop means located in lubricator 22. In abutting the upper stop means, mandrel head 74 of the plunger impacts against the bumper 68, thereby forcing the bumper in an upward direction against the spring 72. This impact causes the central mandrel 95 to travel in an upward direction, whereby the gap at 96 is closed, the gap at 97 is opened, and the splines 88, 98, and 94 are aligned with respect to each other due to the action of the guide means 143 in guidably rotating member 95 as it reciprocates from the fluid flow preventing position indicated in FIGURE 4 to the fluid flow permitting position indicated in FIGURE 3. The piston is now in the free falling, or open position where it offers minimum resistance to the flow of fluid through the aligned splines.

Upon contacting the bumper pad 68, the abutment means 74 receives the free depending nozzle end 62 of piston rod 58 within the conical shaped cavity 76, whereupon pump piston 46 is driven in an upward direction with respect to the cylinder 32. This action forces fluid from the second chamber 36 through the check valve assembly 50, through the passageway 60, into passageway 78, through the ball check valve 104, and into the chamber 140 of the free piston.

The impact of the free plunger against the bumper pad also instantaneously reciprocate the heavy check valve 136 to thereby expel a quantity of well fluid from the chamber 140. Due to the mass of bumper pad 68, the check valve 136 probably has been upset and begins to reseat as cheimcal first begins to enter passageway 78. This action aids the flow of chemical into the chamber 140. Hence the chamber contains a mixture of chemical and well fluid therein after it falls free of the bumper pad. Where the well fluid contains a substantial amount of light ends ($C_2H_6$, $C_3H_8$, $C_4H_{10}$) which "boil off" as the plunger travels in an upward direction, a vapor space will be formed in the chamber according to the chemical composition of the well fluid, and in accordance with the bottom hole pressure, aperture 85 optionally provides a path through which vapor may escape.

As the free piston falls away from the bumper pad and begins its long journey back to the bottom of the well tubing, the bumper pad is forced back into the configuration of FIGURE 2 by the coiled spring 72. This action pulls liquid from the chemical source 24, through flow line 26, into reservoir 34, through the check valve assembly at 38, to thereby refill the lower chamber 36 with chemical as the apparatus assumes the stand-by configuration of FIGURE 2.

Upon the free plunger reaching the lower stop means 18 near the oil producing stratum 12, the lowermost portion 92 of the plunger strikes the lower stop means, thereby decelerating the piston, whereupon inertia causes the outer centrally located member 95 to reciprocatingly and rotationally move back into the position of FIGURE 4, that is, the misaligned configuration which offers the maximum resistance to flow of fluid across the plunger.

The impact of the member 92 against the lower stop means 18 also caused the nipple 136 to move upward to thereby upset the check valve means 124, 126. The valve will remain unseated for a considerable length of time since the traveling plunger usually remains against the lower stop member until the well outflow valve (not shown) is again opened. Therefore, chemical within chamber 140 is free to drain from the plunger. It is advantageous to employ a chemical having a density different from the surrounding well fluid to thereby enable the chemical to be more readily displaced by the well fluid. Regardless, the action of the nipple 136 causes the valve element 122 to enter chamber 140 to thereby immediately and positively displace this amount of chemical. Any additional displaced chemical will be a result of differences in density of the fluids causing flow of the chemical from the free plunger.

In the modification of FIGURE 8, two reciprocating central members 295 and 296 are substituted for the single member 95 of FIGURE 4, otherwise the tool is essentially the same as described above in conjunction with FIGURE 4. The free plunger of FIGURE 8 is provided with the same multiple guide means seen at numeral 143, with each of the movable members 295 and 296 being provided with corresponding splines 142 which are arranged in opposite angular directions with respect to each of the movable members. The members 295 and 296, upon being returned to the closed position rotate in opposite directions while being reciprocated in a downward direction to thereby misalign slots 294 with respect to slot 298, misalign slot 288 with respect to slot 297, and misalign slot 297 with respect to slot 298. In other words, member 296 may reciprocate counterclockwise while member 297 reciprocates clockwise, while at the same time each slot is misaligned with slots 288 and 294 as well as with each other.

It is considered within the comprehension of this invention to substitute a valve comprised of a flexible diaphragm having a slit therein for the valve means as seen at 102, to thereby enable the use of a longer nozzle at 62. Such a combination allows injection of the chemical directly into chamber 140 with a minimum of spillage, since the nozzle extends well into the chamber through the slit, while at the same time, the slit provides an effective relief passageway to prevent back pressure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. The method of treating wells comprising the steps of:
    lifting fluid from a fluid producing stratum of a well with a traveling plunger which reciprocates between the bottom and the top of the well;
    injecting treating chemicals into the plunger when the plunger is located at the top of the well;
    transporting the injected chemical to the bottom of the well by the plunger by the action of the plunger as it falls to the bottom of the well;
    releasing at least a portion of the treating chemical from the plunger at the bottom of the well to thereby treat the well with the injected chemical.

2. The method of claim 1 wherein the step of injecting chemical into the plunger is carried out by the step of:
    forming a cavity within the plunger; and injecting the treating chemical into the cavity.

3. The method of claim 1 wherein the step of injecting chemical into the plunger is carried out by the steps of:
    pumping the treating chemical through a nozzle in response to the plunger reaching the upper limits of its travel;
    forming a cavity within the plunger;
    inserting the nozzle into the cavity while carrying out the previous pumping step.

4. The method of claim 1 and further including:
    forming a cavity within the plunger, connecting a valve to the cavity to enable treating chemical to flow through the valve, into the cavity, when the valve is open;
    pumping the treating chemical through a nozzle in response to the plunger reaching the upper limits of travel;
    opening the valve in response to the plunger reaching the upper and lower limits of its travel;
    flow communicating the nozzle with the opened valve druing the previous pumping step to enable treating chemical to flow into the chamber in order to carry out the recited step of injecting treating chemical into the plunger.

5. The method of claim 1, and further including:
    forming a cavity within the plunger, flow communicating the cavity with the inside of the well, carrying out the step of injecting chemical into the plunger by flowing the injected chemical into the cavity while the plunger is at the top of the well, carrying out the step of releasing the treating chemical by flowing at least a portion of the injected chemical from the cavity when the plunger is at the bottom of the well.

References Cited
UNITED STATES PATENTS

| | | | |
|---|---|---|---|
| 2,437,475 | 3/1948 | Oxford | 166—1 X |
| 2,642,139 | 6/1953 | Bedford | 166—1 X |
| 2,714,855 | 8/1955 | Brown | 166—153 X |
| 2,852,080 | 9/1958 | Roach | 166— 1X |

JAMES A. LEPPINK, Primary Examiner